E. C. MIDGLEY.
DIMMER.
APPLICATION FILED JAN. 28, 1921.

1,392,878.

Patented Oct. 4, 1921.

Ernest C. Midgley, Inventor

By Samuel Herrick, Attorney

UNITED STATES PATENT OFFICE.

ERNEST C. MIDGLEY, OF WHEATLAND, NORTH DAKOTA.

DIMMER.

1,392,878.　　　　Specification of Letters Patent.　　Patented Oct. 4, 1921.

Application filed January 28, 1921. Serial No. 440,748.

*To all whom it may concern:*

Be it known that I, ERNEST C. MIDGLEY, a citizen of the United States of America, residing at Wheatland, in the county of Cass and State of North Dakota, have invented certain new and useful Improvements in Dimmers, of which the following is a specification.

This invention relates to dimmers and it has for its object to provide a structure adapted to be mounted upon the windshield of an automobile and to serve to protect the eyes of the driver from the glare of the lights of approaching vehicles.

Further objects and advantages of the invention will be set forth in the detailed description which follows.

In the accompanying drawing.

Like numerals designate corresponding parts throughout the several figures of the drawing.

Figure 1:
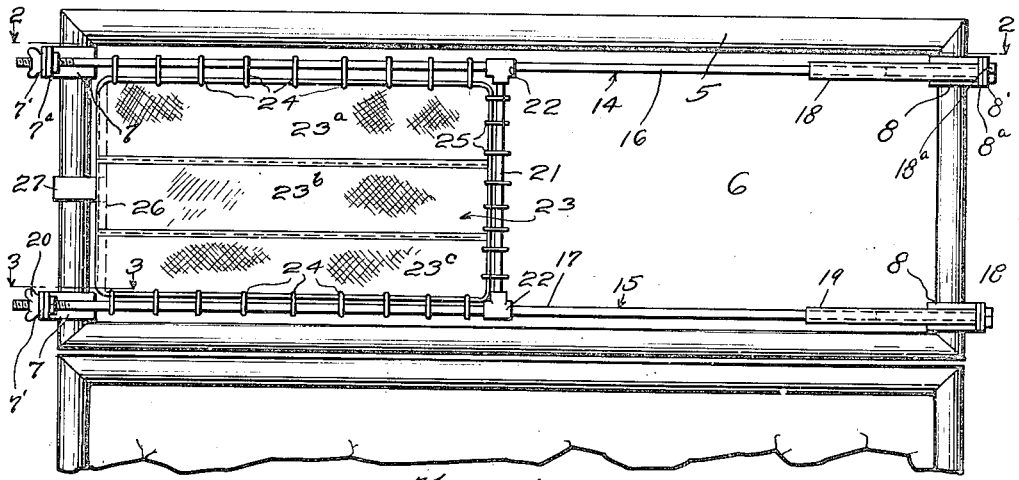
Figure 1 is an elevation looking from the inner side of the windshield and illustrating the application of the device.
Figure 2:
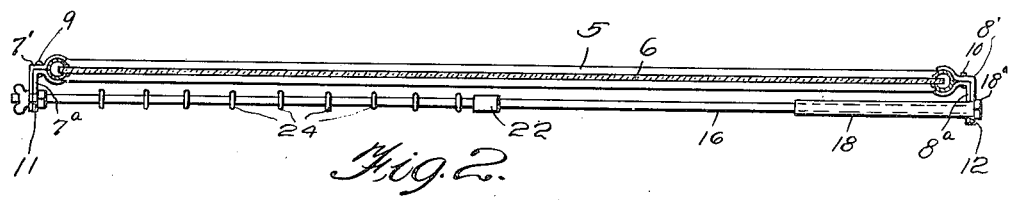
Fig. 2 is a horizontal sectional view upon line 2—2 of Fig. 1.
Figure 3:
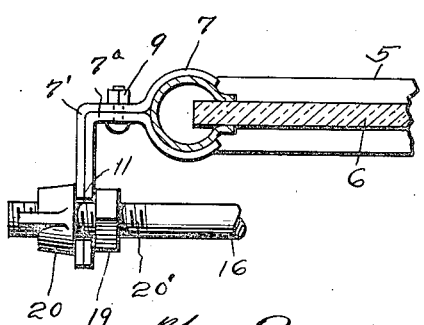
Fig. 3 is a horizontal sectional view upon line 3—3 of Fig. 1.
Figure 4:
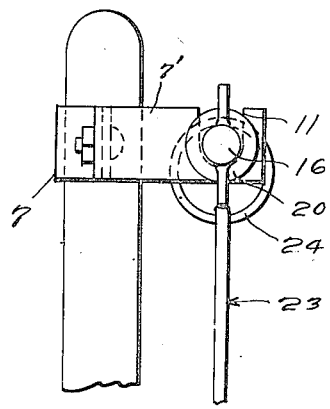
Fig. 4 is an end elevation of a clip hereinafter described.

Referring to the drawing 5 designates the frame of the windshield and 6 the glass thereof. In carrying out the invention I provide clips 7 and 8 consisting of the two parts 7' and 7a and 8' and 8a respectively, these two parts being bound together by bolts 9 and 10, respectively. The extremities of these clamps are extended rearwardly and these rearwardly extending portions are provided with notches 11 and 12. It will be observed that there are two of the clamps 7 and two of the clamps 8, one of the clamps 7 and one of the clamps 8 being located adjacent the top of the windshield and the other clamp 7 and the other clamp 8 being located adjacent the lower portion of the upper panel of the windshield. These clamps serve to support upper and lower extensible members 14 and 15, said members comprising rods 16 and 17 and sleeves 18 and 19 in which said rods are suitably engaged. The sleeves 18 are engaged in the notches 12 of the clamps 8 while the rods 16 are engaged in the notches of the clamps 7. The sleeves 18 are provided with heads 18a outwardly of the clamps while the rods 16 and 17 are provided with thumb nuts 19 and 20 outwardly of the clamp 7, said thumb nuts engaging threaded portions 20 of said rods.

By virtue of the construction described the adjustable elements may be extended at will, or may be contracted as the case may be, to fit windshields of varying widths. A division rod 21 is engaged with T's 22 and these T's slide on the rods 16 and 17. A shade or curtain indicated in general at 23 is secured by rings 24 along its upper and lower edges to the rods 16 and 17, it being understood that the rings 24 are adapted to slide along these rods. Rings 25 secure the forward edge of the curtain to the division rod 21. A rigid strip 26 is secured to the rear edge of the curtain and this strip in turn carries a clip 27 that is engaged with the frame of the windshield. Thus the rear edge of the curtain is held against movement and the division rod may be pushed over toward the clip 27 when it is desired to leave the windshield free of the protecting curtain 23. This curtain is of varying thicknesses throughout its height. In other words it has an upper section 23a that is of three fold thickness. It has an intermediate section 23b that is of double thickness and it has a lower section 23c that is of single thickness and is nearly transparent.

When the dimmer is to be used, the driver grasps the division rod 21 and pulls it toward the right. The length of the curtain limits the distance to which this division rod may move and by this means the curtain is quickly drawn taut across the upper part of the windshield in front of the driver. The curtain is preferably of such length as to extend only part way across the windshield. The driver may, by slightly shifting his position, interpose any desired thickness of material between his eyes and the light of an oncoming machine. For holding the curtain in operative position a pin may be engaged in a recess in the rod 17 in the rear of the lower key 22.

It is to be understood that the invention is not limited to the precise construction set forth but that it includes within its purview whatever changes fairly come within either the terms or the spirit of the appended claims.

Having described my invention, what I claim is:

1. A device of the character described comprising upper and lower extensible elements consisting of sleeves and rods slidable in said sleeves, clips adapted to embrace and grip the side members of the frame of a windshield, said clips comprising rearwardly extending notched portions in which said rods and sleeves are received, said sleeves being headed outwardly of said rearwardly extending portions and said rods being provided with threaded portions outwardly of said rearwardly extending portions and thumb nuts upon said threaded portions, a division bar slidable upon said rods, a curtain engaged with said division bar and rings engaging said rod and said curtain.

2. A device of the character described comprising upper and lower rods, means for securing the same to the frame of a windshield, a division bar slidable upon said rod and a flexible curtain of varying thicknesses throughout its height slidably engaged with said rod and having its ends secured to said division bar.

In testimony whereof I affix my signature in the presence of two witnesses.

ERNEST C. MIDGLEY.

Witnesses:
GRANT STEVENS,
LUTE McQUOND.